UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS OF TREATING ALUMINUM-SILICATE ORES.

No. 929,518.  Specification of Letters Patent.  Patented July 27, 1909.

Application filed May 4, 1909. Serial No. 493,879.

*To all whom it may concern:*

Be it known that I, FRANK J. TONE, of Niagara Falls, Niagara county, New York, have invented a new and useful Process of Treating Aluminum-Silicate Ores, of which the following is a full, clear, and exact description.

My invention relates to the smelting of aluminum silicate ores in electric furnaces. In my United States Patent No. 906,172, granted on December 8th, 1908, I described a process of smelting aluminum ores wherein a mixture of aluminum silicate, carbon, and base metalliferous material, such as iron oxid, is heated in an electric furnace. In this process under proper conditions, the products are fused aluminate and silicon alloy. In the use of the said patented process, on account of the high percentage of silica present in the aluminum silicate, some difficulty has been found in entirely removing the silica by reducing it to silicon and alloying this silicon with the metal of a metalliferous material.

My invention is designed to provide an improved and more easily operated process by which the silica may be more effectually removed.

To that end, the invention consists in carrying out the smelting in two stages, in the first of which the silica is only partially reduced and in the second of which its reduction is completed.

I will now describe one specific method which I have successfully used in accordance with my invention. A charge is made up consisting of aluminum silicate, iron oxid and carbon in about the following proportions by weight: aluminum silicate, 222 parts; ferric oxid, 160 parts; carbon, 60 parts. The proportions of this charge are such that the carbon is sufficient to reduce all the iron and about half of the silica. This mixture is charged into an electric furnace of any type suitable for giving a temperature sufficient to reduce the silica in the presence of iron oxid. For this purpose, I have used with good results an electric furnace of the horizontal incandescent type heated by a central carbon core embedded in the charge. The current is passed through the furnace to an amount sufficient to heat the mixture to the temperature at which the aluminum silicate is dissociated and the silica is partially reduced in the presence of iron, this reduced product remaining more or less in a granular or shotted form scattered throughout the charge. I do not aim to collect this product in a fused mass in the first operation, although silicon iron alloy often does collect and settle in the bottom of the furnace. Some aluminum carbid and silicon carbid are also incidentally formed. After this partial reduction of the silica, the products are removed from the furnace, and are then mixed with additional carbon and additional iron oxid and subjected to the second step of the process, carried out in an electric furnace. In this second step I preferably use an ordinary form of arc furnace with vertical electrodes depending into the furnace pot or chamber. The charge mixture is fed around the electrodes, and the current is passed through the furnace in sufficient quantity to fuse the charge and result in a substantially complete reduction of all the silica and fusion of the alumina. The fused silicon forms an alloy with the iron, much of which settles at the bottom of the furnace from which it may be tapped at intervals if desired.

Instead of adding an insufficient quantity of carbon to reduce the silica in the first step, I may add sufficient carbon to completely reduce the silica. But in such case I carry the first step only to the point where the silica is only partially reduced. In this case, the remaining carbon may appear in the products of the first step as free carbon, or as aluminum carbid or silicon carbid, or both. In this case the second step is carried on as before, more iron oxid being added to the charge. The iron may be added in the form of finely divided metal instead of the oxid, in either case, in which case the amount of carbon is correspondingly reduced to an amount corresponding to the reduction or partial reduction of the silica.

The advantages of my invention will be apparent to those skilled in the art. Where the silicon is reduced in one operation, the conductivity and fluidity of the fused charge is high owing to the larger amounts of carbon and iron oxid. In this case the furnace treatment possesses some difficulty. In the present case, the conductivity of the charge is much lower, due to its lower content of iron oxid. The loss of alumina by reduction is also reduced in the two-stage process.

The silicids produced by this process are useful for various purposes, such as the refining of iron and steel, and the alumina is useful as an abrasive and also as an ore for the production of metallic aluminum.

Many changes may be made in the apparatus employed in the details of the steps without departing from my invention.

I claim:—

1. The process of treating aluminum silicate, which consists in forming a charge of aluminum silicate, base metalliferous material, and carbon, subjecting such charge to electrically developed heat, partially reducing the silica thereby, and alloying the reduced silicon with the reduced metalliferous material, then increasing the percentage of metalliferous material and subjecting the charge to sufficient electrically developed heat to fuse the alumina, reduce the silica and alloy the silicon with the reduced metalliferous material.

2. The process of treating aluminum silicate, which consists of forming a charge of aluminum silicate, base metalliferous material, and carbon, subjecting said charge to electrically developed heat sufficient to dissociate the aluminum silicate, partially reduce the silica and alloy the silicon with reduced metalliferous material, removing the products from the furnace; then forming a second charge of said products and additional metalliferous material, subjecting said second charge to electrically developed heat sufficient to fuse the alumina, completely reduce the silica, and alloy the silicon with the reduced metalliferous material.

3. The process of treating aluminum silicate, which consists of forming a charge of aluminum silicate, base metalliferous material and carbon, the carbon being in amount sufficient to reduce only part of the silica, subjecting said charge to electrically developed heat sufficient to dissociate the aluminum silicate partially reduce the silica, and alloy the silicon with the reduced metalliferous material, removing the products from the furnace; then forming a second charge of said products mixed with sufficient carbon and metalliferous material to complete the reduction of the silica and alloy the reduced silicon, subjecting said second charge to electrically developed heat sufficient to fuse the alumina, completely reduce the silica and alloy the silicon with the reduced metalliferous material.

4. The method of smelting aluminum silicate, consisting in subjecting a charge of aluminum silicate, base metalliferous material, and carbon, to electrically developed heat, partially reducing the silica, adding further metalliferous material, and completing the reduction of silica.

In testimony whereof, I have hereunto set my hand.

FRANK J. TONE.

Witnesses:
W. A. DWYER,
F. I. PIERCE.